United States Patent
Class

[11] 3,900,367
[45] Aug. 19, 1975

[54] RESTRAINT SYSTEM FOR CORE ELEMENTS OF A REACTOR CORE

[75] Inventor: Gottfried Class, Blankenlock, Germany

[73] Assignee: Gesellschaft fur Kernforschung m.b.H., Karlsruhe, Germany

[22] Filed: Dec. 6, 1972

[21] Appl. No.: 312,577

[30] Foreign Application Priority Data
Dec. 15, 1971  Germany............ 2162171

[52] U.S. Cl. .................. 176/87; 176/78; 176/85
[51] Int. Cl. .................................. G21c 19/12
[58] Field of Search ........... 176/84, 85, 78, 87, 86, 176/35

[56] References Cited
UNITED STATES PATENTS

| | | |
|---|---|---|
| 3,100,188 | 8/1963 | Fraas et al. .......................... 176/85 |
| 3,198,709 | 8/1955 | Macomber .................... 176/86 R X |
| 3,206,374 | 9/1965 | Lemsle et al. ......................... 176/85 |
| 3,332,850 | 7/1967 | Jonsson et al. .................... 176/86 R |
| 3,607,643 | 9/1971 | Paget .................................... 176/84 |
| 3,629,066 | 12/1971 | Andersson et al. ............... 176/78 X |
| 3,629,070 | 12/1971 | Stanklewicz ......................... 176/85 |
| 3,708,393 | 1/1973 | Waymire et al. ..................... 176/85 |

Primary Examiner—Benjamin R. Padgett
Assistant Examiner—P. A. Nelson
Attorney, Agent, or Firm—Spencer & Kaye

[57] ABSTRACT

In a nuclear reactor, a core element bundle formed of a plurality of side-by-side arranged core elements is surrounded by restraining elements that exert a radially inwardly directed restraining force generating friction forces between the core elements in a restraining plane that is transverse to the core element axes. The adjoining core elements are in rolling contact with one another in the restraining plane by virtue of rolling-type bearing elements supported in the core elements.

8 Claims, 6 Drawing Figures

RESTRAINT SYSTEM FOR CORE ELEMENTS OF A REACTOR CORE

BACKGROUND OF THE INVENTION

The present invention relates to a restraint system for prismatic core elements of a vertical, longitudinal cylindrical reactor core consisting of restraining elements arranged on the circumference of the core and exerting radial restraining forces upon the core elements from the shell of the core.

Such core restraint systems serve the purpose of safeguarding the dimensional stability of the reactor core structure under all operating conditions of the reactor so that the structural coefficients of reactivity are defined and permissible at any time. In addition, high reactor availability is to be ensured despite radiation damage to structural materials, that is, embrittlement, differential swelling or radiation induced creeping of these materials. These objectives can be met only if support structures permanently located in the core are avoided, i.e., if external restraint at so-called planes of restraint is chosen, if material stresses are kept within permissible limits everywhere, and if easy exchangeability of all core elements is ensured (such as fuel element handling, control rol and shutdown rod guide tubes). The position of these planes of restraint, i.e., those planes at which the fuel elements contact each other, is found from the requirements with respect to reactivity coefficients and from material stresses, taking into account the theoretical bending line of the core element generated under various stress conditions.

A very difficult problem associated with these planes of restraint in nuclear reactors cooled with liquid sodium at coolant temperatures around 500°– 600°C is constituted by the excessive friction coefficients. These higher friction coefficients, which are due to some extent to the effect of self welding, greatly aggravate or even render impossible the application of force to the core element bundle at the plane of restraint.

SUMMARY OF THE INVENTION

It is the purpose of the present invention to create a restraint system for these core elements in which the friction forces existing at the planes of restraint between the individual core elements are minimized so as to ensure uniform core restraint under all operating conditions of the reactor. In addition, this core restraint system should be easy to operate and allow simple loading and unloading of the core elements.

In a restraint system of the type mentioned initially, this problem is solved according to the present invention so that the core elements contact each other at specific planes of restraint and are connected at the points of contact by rolling-type bearing elements, such as balls, rollers, ball or needle roller bearings, in which any movement of the core elements will cause rolling friction to be generated at least at one point of contact of the sections touching the core element. An alternative solution of the problem according to the present invention provides for contacts between the core elements at specific planes of restraint and for the connections being elements which can be elastically deformed. Also in the solution according to the first concept of the present invention, there is considerable advantage in that the bearing elements are attached to springs or act upon components which can be elastically deformed by the forces of restraint at the planes of restraint.

In a preferred embodiment of the present invention, a tubular box which can be inserted into the cladding wall of the core elements is arranged at the planes of restraint, the outside of which box carries all the components accommodating and transferring, respectively, the movements and forces of restraint. In a preferred design of the bearing elements, two rollers each are installed in the planes of restraint at the points of contact of the core elements in recesses of the outside surface of the box in such a way that their center axes extend parallel to the core element, the outer diameter of which rollers extends beyond the outside surface and the shaft journal of which is pivoted in the core element box by means of needle roller bearings having axial tolerances. In this arrangement, the actual points of contact are designed so that the rollers are offset relative to the center with respect to the respective straight wall section of the box; in this way, opposite pairs of wall components will cause each roller to be supported by the wall section of the adjacent box located by the side of the recess; this wall component is designed so as to be elastic under bending stresses perpendicular to the restraining force. In this way, the rollers will preferably contact the respective opposite walls, elastically deforming them, and in this way generate the actual constraining pressure in the plane of constraint which, in this way, can be distributed in the most favorable way throughout the entire reactor core. In a preferred embodiment, the wall component elastic under bending stress will consist of a bending bar supported in two points perpendicular to the wall in a recess of the box like a transverse beam. The wall of the box behind the bending bar may be adapted to the bending line so that the flexural bar contacts the fitted wall of the box under the maximum restraining force. In this way, the deformation can be limited.

The restraint around the circumference, for instance, of a sodium cooled reactor core with hexagonal core elements is generated in the most advantageous way if the restraint elements arranged around the circumference of the reactor core have hexagonal cross sections and are longitudinally divided over the area between the planes of restraint; in this region, the restraint element box installed opposite the core elements is movable, penetrating into the other box like a sealed piston in such a way that the space between the two boxes is connected, say, to the sodium inlet pressure and the outer space between the restraint elements and the core elements is connected to the sodium outlet pressure and a return spring designed as a bending bar is installed between the two boxes for the movable restraint element box. In this way, the reactor core can be restraint at low stress in a very simple way, the stress being on the order of the sodium inlet pressure, which allows it to be generated by commercial sodium pumps. However, it is also possible to use the sodium pressure of the coolant pumps proper.

DESCRIPTION OF THE PREFERRED EMBODIMENT

Figure 1:
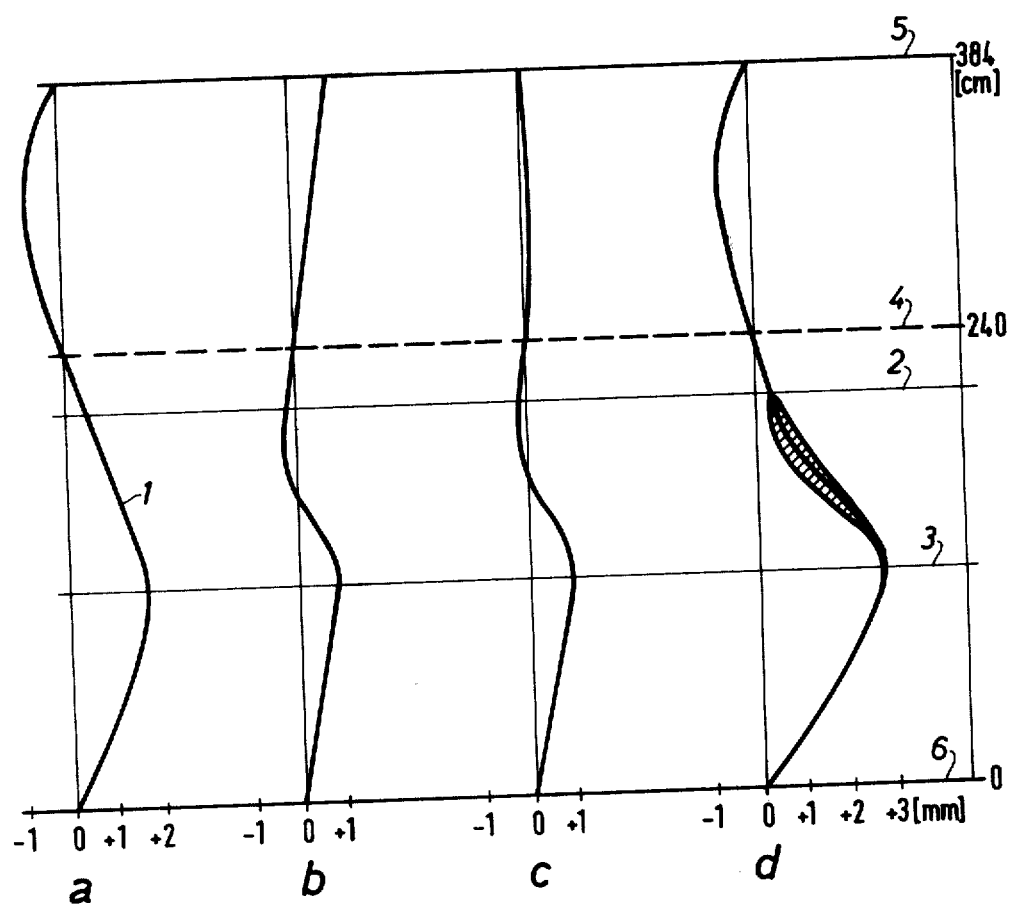
FIG. 1 shows the theoretical bending lines of reactor core elements under various conditions.

FIG. 1 is a principal diagram of the theoretical bending lines 1 of the reactor core elements under various conditions. In cases b–d, the in core residence time is 300 days. The fuel zone of the reactor is located between lines 2 and 3. Lines 4 and 5 constitute the planes of constraint. Line 6 is the foot support plane.

Case (a) is the bending line of a core element represented under purely thermal bending in the heated condition. Case (b) represents the bending line of an element under swelling and creep deformation in the cold condition; there has been no restraint in the plane of restraint 5. In case (c), the bending line of case (b) has been represented with the difference of the core element being restrained in the plane of restraint 5 in this case, and in case (d) the element is restrained in the heated condition. Thus, case (a) shows the purely thermal influence upon bending of the core elements and cases (b) – (d) show the influence of the deformation of structural material, caused by the period of exposure to reactor conditions, due to swelling and creep and superimposed by the temperature effects.

Figure 2:
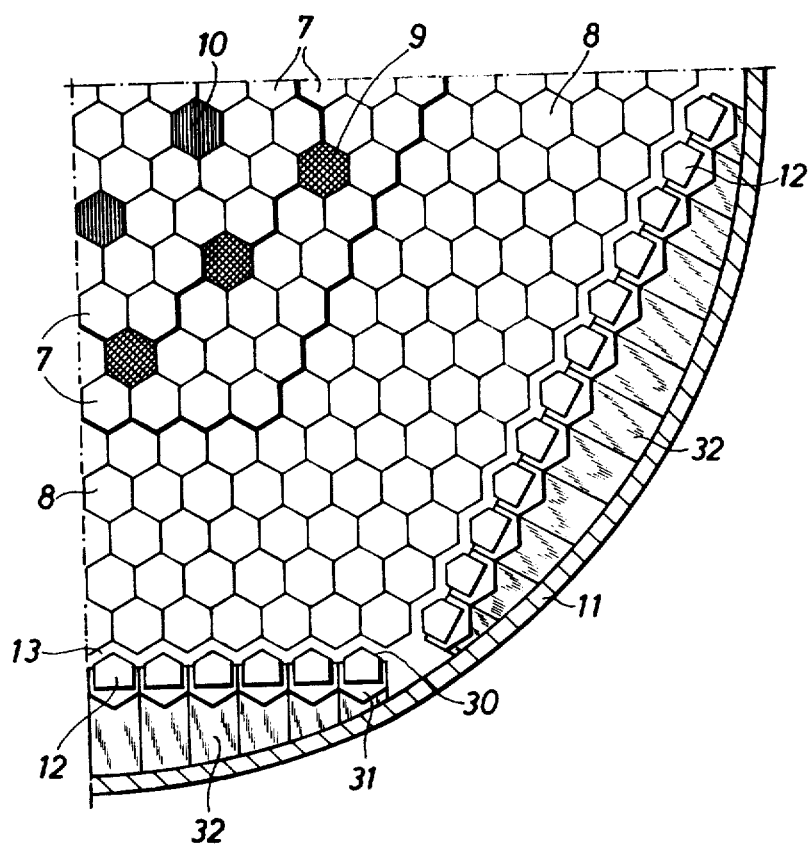
FIG. 2 is a cross section through the reactor core.

FIG. 2 is a partial cross section through the reactor core. The core elements with a hexagonal cross section consist of the fuel elements 7, the blanket elements 8, the shim rods 9, and the shutdown rods 10. Around the core element bundle, which constitutes a hexagonal unit, the sodium hydraulic expansion elements 12 are arranged within the core shell 11. They are outlined in greater detail in the legend of FIGS. 5 and 6. The coolant, liquid sodium in this case, flows through the core elements within their cladding wall 14 losing some of its pressure in the process. The space 13 between the expansion elements 12 and the blanket rods 8 is subjected to the sodium outlet pressure, i.e., the same pressure as at the outlet of the inner core element space. However, the inner space of the expansion element 12 is subjected to the sodium inlet pressure, that is, the pressure upstream of the inlet into the inner core element space; hence, there is a pressure difference relative to space 13.

Figure 4:
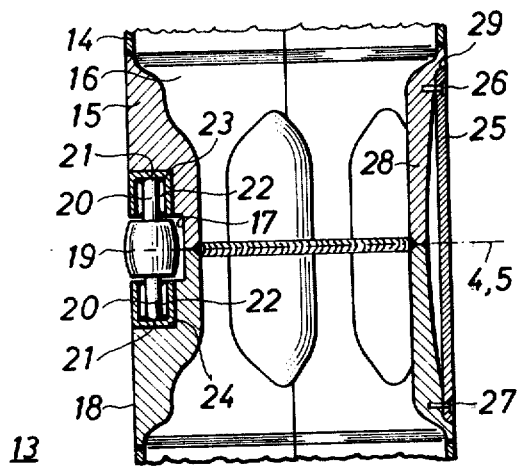
FIG. 4 is a section along line AB of FIG. 3.
Figure 3:
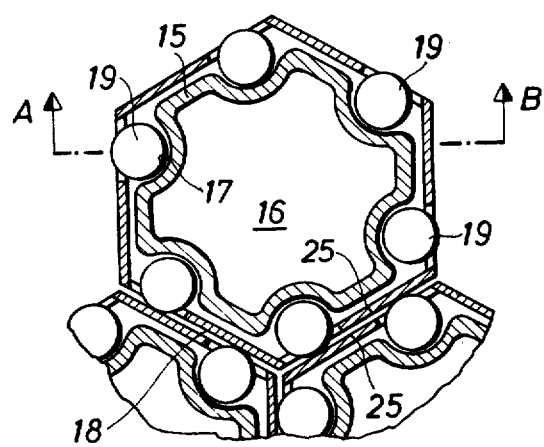
FIG. 3 shows details of the core elements at their points of contact in the respective plane of restraint.

FIGS. 3 and 4 show details of the reactor core in the respective planes of restraint 4 and 5.

It is noted that in FIG. 4 there is shown a single plane of restraint designated at 4, 5. This indicates that the structure shown in FIG. 4 is present in both planes 4 and 5. It is to be understood that in reality — as it can be observed, for example, in FIG. 1 — the planes of restraint 4 and 5 are axially spaced from one another.

In the planes of restraint 4, 5 a tubular box or support member 15 is inserted into the cladding wall 14 of core elements 7, 8, 9, 10 and welded to it. For this purpose, as it is well observable in FIG. 4, the cladding wall 14 is discontinued to accommodate the tubular support member 15. The tubular box or support member 15 has a free cross section 16 on the inside which allows the unrestricted passage of the coolant flowing axially through the core elements. The pressure difference between the free cross section 16 and the space 13 corresponds to the pressure drop assigned to the respective height of the core, that is, if all of the reactor core is located below the plane of restraint, it would approximately correspond to the full pressure drop. The box 15, just as the core elements, has a hexagonal cross section and is provided with recesses 17 in its outer surfaces which are laterally offset relative to the center relative to the straight section of the outer hexagonal surface. The recesses 17 contain one roller 19 each with the center axis extending parallel to the core element, the upper and lower sides of the rollers being equipped with one shaft journal 20 each. The shaft journals 20 are slightly spherical at their ends 21 and supported by needle roller bearings 22 in bushes 23 and 24. These bushes 23 and 24 are fixed in the recesses 17. The outside diameter of roller 19 protrudes beyond the hexagonal outer surface 18 of the tubular box 15 and, because of its good movability relative to the box 15 and hence also relative to the core elements, allows the core elements to be displaced relative to each other by a certain amount, although there is a restraining force and a restraining stress, respectively, in the planes of restraint 4 and 5. In order to ensure and limit this restraining stress, the rollers 19, as mentioned above, are laterally offset with respect to the center of the hexagonal outside surface 18 and act upon each of the opposed hexagonal outer surfaces 18 of the respective other fuel element box in pairs together at a spring 25 designed like a bending bar. The spring 25 is supported in two points like a bending bar by means of bolts 26 and 27 in a recess 29 and can be compressed and relaxed due to the special design of the wall section 28 of the box 15 situated behind the spring 25. The wall section 28 is adapted to the bending line of spring 25 in such a way that the maximum restraining force will cause the spring 25 to abut against the wall section 28. In this case, the spring 25 may be flexured by up to may be mm. Under certain conditions, the rollers 19 may be replaced by spring elements capable of accommodating forces from various directions. The rollers 19 may also be supported in such spring elements, which minimizes friction forces but calls for a slightly higher expenditure in the design. In the preferred embodiment, the rollers 19 and their shaft journals 20 have a certain amount of axial play in the bushes 23 and 24. This allows the rollers 19 to move axially within certain limits and to abut against the inner surfaces of the bushes 23 and 24 at the spherical ends 21 of the shaft journals 20. In this way, blocking of the rollers 19 due to axial forces can be avoided.

Figure 5:
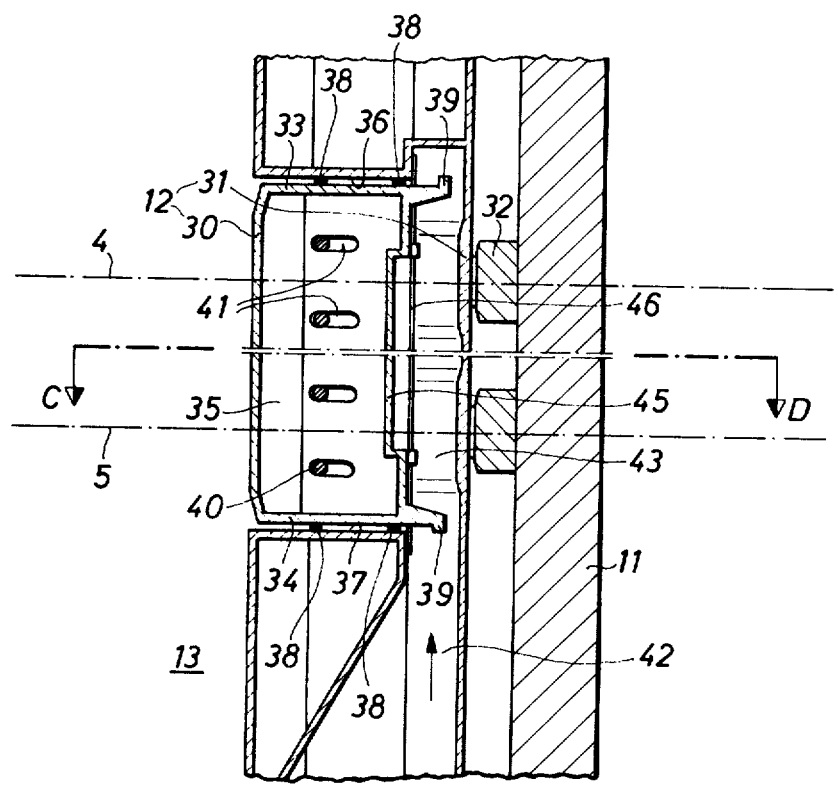
FIG. 5 shows a side view of a cross section of one of the restraining elements arranged on the circumference.
Figure 6:
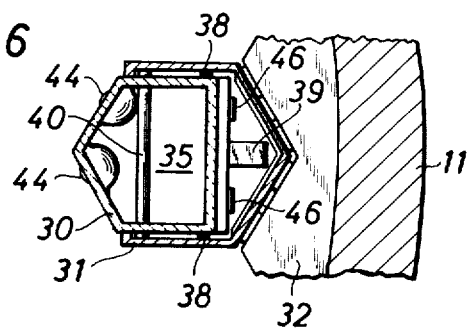
FIG. 6 is a section along line CD in FIG. 5.

FIGS. 5 and 6 show the hydraulic expansion elements 12 arranged on the circumference of the reactor core in greater detail. The expansion elements 12, like the core elements 7, 8, 9, 10, have a hexagonal cross section and are longitudinally subdivided approximately over the area of the planes of restraint 4 and 5. In this area, the restraining element 12 consists of two parts 30 and 31, which part 30 and 31, of which part 30 must be regarded as the inner part situated opposite the area of the core elements, and part 31 constitutes the outer part externally supported on the core shell 11 by distance elements 32 (see FIG. 6 and FIG. 2). Above and below the planes of restraint 4 and 5, the inner part 30 of the restraining element box is closed by partitions 33 and 34 in the direction axial to the longitudinal axis of the restraining element. The partitions 33 and 34 are interconnected by a rear wall 45 so as to generate a closed cavity 35 in the inner box. The inner box 30 with the cavity 35 is now movable perpendicular to the longitudinal axes of the restraining element and is sealed at the guide surfaces 36 and 37 by means of gaskets 38. The travel of the box 30 is limited by means of distance pads 39 and limiting pins 40 in oblong holes 41. Behind the component 30 there is a cavity 43 connected with a duct 42 and sealed relative to the space 13 between the core elements and between the restraining elements and core elements, respectively. If there is a pressure difference between the cavity 43 and the space 13, the inner box 30 will move perpendicular to the longitudinal axis of the restraining element and will abut against the core elements due to the rollers 44. The contact pressure is a function of the effective area of the rear wall 45 and the pressure difference in the cavity 43 acting upon it. A flexural spring 46 designed as a bar is installed between the two parts 30 and 31 of the restraining element to retract the inner movable part 30 to its original position as soon as the pressure difference ceases to exist; in this way, both the restraint is removed and the core elements can easily be extracted from the top of the reactor core.

The space 13 between the core elements and the restraining elements is subjected to the sodium outlet pressure in a sodium cooled nuclear reactor, whereas the cavity 43 is kept roughly at sodium inlet pressure. The resultant pressure difference causes the core elements to be restrained. It is advisable to generate the pressure in the cavity 43 by a separate pump because operation of the reactor at half the power level requires only about one quarter of the original coolant pressure, which would make the restraint dependent on the load. The sodium differential pressure in the cavity 43, however, should be constant under all operating conditions of the reactor and should amount to the magnitude of the pressure drop in the core; hence, for cost reasons, the usual type of pumps can be used for pressure generation.

The present invention in an advantageous manner decisively reduces the effect of the high friction forces between the core elements of a nuclear reactor, which may be very high especially under hot sodium, due to partial seizing effects. This together with the action of the elastic elements can ensure that the fuel elements are arranged in the correct geometry in the hexagonal grid while being pushed together in the planes of restraint. The reduction of friction and the universal compressibility of the fuel element cross sections in the planes of constraint allow a quasihydrostatic and hence calculable pressure stress to build up in the planes of constraint due to the action of the circumferential restraint. This pressure stress condition will remain under control even if the fuel boxes are bent due to thermal radiation induced deformation (swelling and creep deformation). Sequential tensioning of external restraining jaws is not necessary because of the advantageous decrease of friction; in this way, it becomes possible to use hydraulic restraining elements for the outer core restraint system which will be actuated together. Their benefits lie in a greatly simplified design allowing, among other things, shorter tensioning periods and in their replaceability, like core elements, in the core element assembly be means of the manipulators and replacement systems provided for this purpose.

I claim:

1. In a restraint system for elongated prismatic core elements having longitudinal axes and arranged in a close, side-by-side, parallel relationship forming a core element bundle, the restraint system being of the type that includes restraint elements arranged circumferentially about the core element bundle and exerting thereto a radially inwardly directed restraining force generating friction forces between the core elements along at least one plane of restraint extending through the core element bundle transversely to said axes at least at one point along its length, the improvement comprising rolling elements arranged between adjoining core elements in the zone of said plane, said adjoining core elements being in contact with their respective rolling elements in said plane, whereby said core elements being in engagement with one another by rolling friction in said plane in response to said force; means for supporting a plurality of said rolling elements in each core element along the circumference thereof; a plurality of resilient bar members secured to each core element along the circumference thereof in the zone of said plane, said resilient bar members being arranged for flexing radially inwardly with respect to the core element to which they are secured, any adjoining two core elements being so oriented with respect to one another that any said rolling element supported in one core element engages one of said bar members supported in the adjoining core element, said resilient bar members constituting means for providing a resilient engagement between at least one of said rolling elements and the adjoining core element it contacts.

2. In a restraint system for elongated prismatic core elements each having a longitudinal axis and a cladding wall, said core elements being arranged in a close, side-by-side, parallel relationship forming a core element bundle, the restraint system being of the type that includes restraint elements arranged circumferentially about the core element bundle and exerting thereto a radially inwardly directed restraining force generating friction forces between the core elements along at least one plane of restraint extending through the core element bundle transversely to said axes at least at one point along its length, the improvement comprising rolling elements arranged between adjoining core elements in the zone of said plane, said adjoining core elements being in contact with their respective rolling elements in said plane, whereby said core elements being in engagement with one another by rolling friction in said plane in response to said force; a tubular support member inserted in and affixed to said cladding wall in the zone of said plane; a plurality of said rolling elements mounted in said tubular support member along the circumference thereof, each rolling element being intersected by said plane and protruding radially outwardly beyond the cladding wall of the core element in which the rolling element is held; and a plurality of resilient bars secured to said tubular support member, said bars being arranged for flexing radially inwardly with respect to the core element in which they are held, the resilient bars held in one core element being so oriented that they are in a contacting relationship with the rolling elements of the core elements adjoining said one core element.

3. A restraint system as defined in claim 2, wherein said cladding wall is discontinued along the axially measured length of said tubular support member.

4. A restraint system as defined in claim 2, each resilient bar includes means defining an opening through which one of said rolling elements projects; the resilient bar and the rolling element projecting therethrough are mounted in one and the same tubular support member.

5. A restraint system as defined in claim 2, wherein each prismatic core element has a plurality of longitudinally extending sides, each being parallel and immediately adjacent to a side of an adjoining core element; any two adjoining core elements are in contact with one another through two of said rolling elements along said immediately adjacent, parallel-extending sides.

6. A restraint system as defined in claim 5, wherein the one and the other of said two rolling elements are held in adjoining core elements.

7. A restraint system as defined in claim 1, wherein said core elements are in contact with one another solely indirectly through said rolling elements.

8. In a restraint system for elongated prismatic core elements each having a longitudinal axis and a cladding wall, said core elements being arranged in a close, side-by-side, parallel relationship forming a core element bundle, the restraint system being of the type that includes restraint elements arranged circumferentially about the core element bundle and exerting thereto a radially inwardly directed restraining force generating friction forces between the core elements along at least one plane of restraint extending through the core element bundle transversely to said axes at least at one point along its length, the improvement comprising rolling elements arranged between adjoining core elements in the zone of said plane, said adjoining core elements being in contact with their respective rolling elements in said plane, whereby said core elements being in engagement with one another by rolling friction in said plane in response to said force; a tubular support member inserted in and affixed to said cladding wall of each core element in the zone of said plane; a plurality of said rolling elements mounted in each said tubular support member along the circumference thereof, each rolling element being intersected by said plane and protruding radially outwardly beyond the cladding wall of the core element in which the rolling element is held; each said tubular support member of each prismatic core element having a plurality of longitudinally extending sides each having a longitudinal center line and each being parallel and immediately adjacent to a side of the tubular support member of an adjoining core element; each rolling element supported at each said side being spaced from the longitudinal center line of that side, whereby each rolling element of opposed pairs of said core elements contacting a side of the adjacent tubular support member, each said side having a resilient portion at least in the area in which it is contacted by the rolling element of an adjacent tubular support member, said resilient portion yielding under bending stresses perpendicular to said restraining force, said resilient portion being formed of a resilient bar member having two ends attached to said tubular support member; wall means forming part of each said tubular support member and bounding a free space radially inwardly of said resilient bar member, whereby said resilient bar member substantially conforms to said wall portion when urged by the contacting rolling element under the action of a maximum force of restraint; shaft journals affixed to each rolling element; needle bearing means for supporting said shaft journals in each said tubular support member; each rolling element having a central or rotary axis extending parallel to the longitudinal axes of said core elements; and means for providing an axial play for each rolling element.

* * * * *